(12) United States Patent
Arishima et al.

(10) Patent No.: US 8,507,870 B2
(45) Date of Patent: Aug. 13, 2013

(54) SOLID-STATE IMAGING APPARATUS AND IMAGING SYSTEM

(75) Inventors: Yu Arishima, Yokohama (JP); Yuichiro Yamashita, Ebina (JP); Masaru Fujimura, Yokohama (JP); Shin Kikuchi, Isehara (JP); Shoji Kono, Hachioji (JP); Shinichiro Shimizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 13/154,525

(22) Filed: Jun. 7, 2011

(65) Prior Publication Data

US 2012/0006993 A1   Jan. 12, 2012

(30) Foreign Application Priority Data

Jul. 7, 2010  (JP) ................................. 2010-155257
May 27, 2011 (JP) ................................. 2011-119712

(51) Int. Cl.
G01T 1/24  (2006.01)

(52) U.S. Cl.
USPC ................................ 250/370.08; 250/370.11

(58) Field of Classification Search
USPC .................. 250/369, 370.01, 370.08, 370.09, 250/370.11
See application file for complete search history.

(56) References Cited

U.S. PATENT DOCUMENTS

| | | |
|---|---|---|
| 4,954,895 A | 9/1990 | Akimoto et al. ......... 358/213.11 |
| 5,245,203 A | 9/1993 | Morishita et al. |
| 5,352,920 A | 10/1994 | Morishita et al. |
| 6,239,839 B1 | 5/2001 | Matsunaga et al. ........... 348/308 |
| 6,780,666 B1 | 8/2004 | McClure ......................... 438/57 |
| 6,900,480 B2 | 5/2005 | Sugiyama ...................... 257/222 |
| 6,906,793 B2 | 6/2005 | Bamji et al. ................ 356/141.1 |
| 6,960,751 B2 | 11/2005 | Hiyama et al. |
| 6,965,135 B2 | 11/2005 | Sugiyama ...................... 257/222 |
| 6,969,877 B2 | 11/2005 | Sugiyama ...................... 257/222 |
| 6,974,980 B2 | 12/2005 | Sugiyama ...................... 257/222 |
| 7,016,089 B2 | 3/2006 | Yoneda et al. |
| 7,321,110 B2 | 1/2008 | Okita et al. |
| 7,348,615 B2 | 3/2008 | Koizumi |
| 7,408,210 B2 | 8/2008 | Ogura et al. |
| 7,429,764 B2 | 9/2008 | Koizumi et al. |
| 7,456,888 B2 | 11/2008 | Kikuchi |
| 7,460,162 B2 | 12/2008 | Koizumi et al. |
| 7,547,871 B2 | 6/2009 | Hiyama et al. |

(Continued)

FOREIGN PATENT DOCUMENTS

EP   1930950 A2   6/2008
JP   01-295458 A   11/1989

(Continued)

*Primary Examiner* — Mark R Gaworecki
(74) *Attorney, Agent, or Firm* — Fitzpatrick, Cella, Harper & Scinto

(57) ABSTRACT

An imaging apparatus has an imaging area formed by arranging a plurality of imaging blocks each including a pixel array, a plurality of vertical signal lines, a horizontal output line commonly provided for the plurality of vertical signal lines to read out signals read out to the plurality of vertical signal lines, a first scanning circuit, and a second scanning circuit, wherein signals of the pixels of a selected row in the pixel array are read out to the plurality of vertical signal lines in accordance with a driving pulse from the first scanning circuit, the signals read out to the plurality of vertical signal lines are sequentially read out to the horizontal output line in accordance with a driving pulse from the second scanning circuit, and a length in a row direction of the pixel array is smaller than a length in a column direction of the pixel array.

9 Claims, 10 Drawing Sheets

(56) References Cited

U.S. PATENT DOCUMENTS

| | | |
|---|---|---|
| 7,550,793 B2 | 6/2009 | Itano et al. |
| 7,554,591 B2 | 6/2009 | Kikuchi et al. |
| 7,623,056 B2 | 11/2009 | Yamashita |
| 7,633,539 B2 | 12/2009 | Yamashita ............... 348/294 |
| 7,679,658 B2 | 3/2010 | Sakurai et al. |
| 7,755,688 B2 | 7/2010 | Hatano et al. |
| 7,808,537 B2 | 10/2010 | Fujimura et al. ............ 348/300 |
| 7,817,199 B2 | 10/2010 | Yamashita et al. ........... 348/308 |
| 7,852,393 B2 | 12/2010 | Kikuchi et al. ............. 348/308 |
| 7,907,196 B2 | 3/2011 | Ogura et al. |
| 7,928,477 B2 | 4/2011 | Kobayashi et al. |
| 7,948,540 B2 | 5/2011 | Ogura et al. |
| 7,961,237 B2 | 6/2011 | Hatano et al. ............... 348/300 |
| 8,330,195 B2 | 12/2012 | Venezia et al. ............. 257/294 |
| 2001/0013901 A1 | 8/2001 | Matsunaga et al. ........... 348/308 |
| 2002/0149688 A9 | 10/2002 | Matsunaga et al. ........... 348/308 |
| 2003/0160887 A1 | 8/2003 | Takahashi .................. 348/350 |
| 2003/0164887 A1 | 9/2003 | Koizumi et al. ............. 348/308 |
| 2003/0169360 A1 | 9/2003 | Rhodes ..................... 348/308 |
| 2005/0127415 A1 | 6/2005 | Yuzurihara et al. .......... 257/292 |
| 2006/0082669 A1 | 4/2006 | Inoue et al. ............... 348/308 |
| 2007/0109437 A1 | 5/2007 | Funaki et al. .............. 348/308 |
| 2007/0205354 A1 | 9/2007 | Li |
| 2008/0068480 A1 | 3/2008 | Okita et al. ............... 348/294 |
| 2008/0273093 A1 | 11/2008 | Okita et al. |
| 2009/0085135 A1 | 4/2009 | Bang ....................... 257/432 |
| 2009/0134433 A1 | 5/2009 | Jung ....................... 257/239 |
| 2009/0201400 A1 | 8/2009 | Zhang et al. ............... 348/296 |
| 2009/0218479 A1 | 9/2009 | Arishima et al. |
| 2009/0244328 A1 | 10/2009 | Yamashita ................. 348/241 |
| 2009/0251578 A1 | 10/2009 | Yamashita ................. 348/302 |
| 2009/0284632 A1 | 11/2009 | Onuki et al. |
| 2009/0303364 A1 | 12/2009 | Shibata et al. ............. 348/302 |
| 2010/0002114 A1 | 1/2010 | Ogura et al. ............... 348/301 |
| 2010/0053398 A1 | 3/2010 | Yamashita |
| 2010/0079635 A1 | 4/2010 | Yano et al. ................ 348/294 |
| 2010/0149366 A1 | 6/2010 | Noda et al. ................ 348/222.1 |
| 2010/0165159 A1 | 7/2010 | Kumesawa .................. 348/294 |
| 2010/0165167 A1 | 7/2010 | Sugiyama et al. |
| 2010/0198482 A1 | 8/2010 | Hartmann et al. ............ 701/103 |
| 2010/0200738 A1 | 8/2010 | Yamashita |
| 2010/0201834 A1 | 8/2010 | Maruyama et al. ........... 348/222.1 |
| 2010/0225793 A1 | 9/2010 | Matsuda et al. |
| 2010/0231767 A1 | 9/2010 | Kikuchi |
| 2010/0328302 A1 | 12/2010 | Yamashita et al. |
| 2010/0328509 A1 | 12/2010 | Yamashita et al. |
| 2011/0007173 A1 | 1/2011 | Takenaka et al. |
| 2011/0013062 A1 | 1/2011 | Yamashita |
| 2011/0025896 A1 | 2/2011 | Yamashita et al. ........... 348/294 |
| 2011/0032379 A1 | 2/2011 | Kobayashi et al. |
| 2011/0032404 A1 | 2/2011 | Kikuchi |
| 2011/0068253 A1 | 3/2011 | Arishima et al. ........... 250/208.1 |
| 2011/0080492 A1 | 4/2011 | Matsuda et al. |
| 2011/0080493 A1 | 4/2011 | Kono et al. |
| 2011/0121404 A1 | 5/2011 | Shifren et al. ............. 257/392 |
| 2011/0134270 A1 | 6/2011 | Arishima et al. |
| 2011/0157441 A1 | 6/2011 | Okita et al. ............... 348/301 |
| 2011/0163407 A1 | 7/2011 | Yuzurihara et al. .......... 257/463 |
| 2011/0168872 A1 | 7/2011 | Kobayashi et al. ........... 250/208.1 |
| 2011/0169989 A1 | 7/2011 | Kono et al. |
| 2011/0234868 A1 | 9/2011 | Yamashita et al. |
| 2011/0242380 A1 | 10/2011 | Ogura et al. ............... 348/300 |
| 2013/0015535 A1 | 1/2013 | Yang et al. ................ 257/408 |

FOREIGN PATENT DOCUMENTS

| | | |
|---|---|---|
| JP | 03-256359 A | 11/1991 |
| JP | 07-058308 A | 3/1995 |
| JP | 2002-026302 A | 1/2002 |
| JP | 2002-044522 A | 2/2002 |
| JP | 2002-051262 A | 2/2002 |
| JP | 2002-090462 A | 3/2002 |
| JP | 2002-344809 A | 11/2002 |
| JP | 2003-218332 A | 7/2003 |
| JP | 2003-318381 A | 11/2003 |
| JP | 2007-081083 A | 3/2007 |
| WO | 2009/146253 A1 | 12/2009 |

F I G. 9
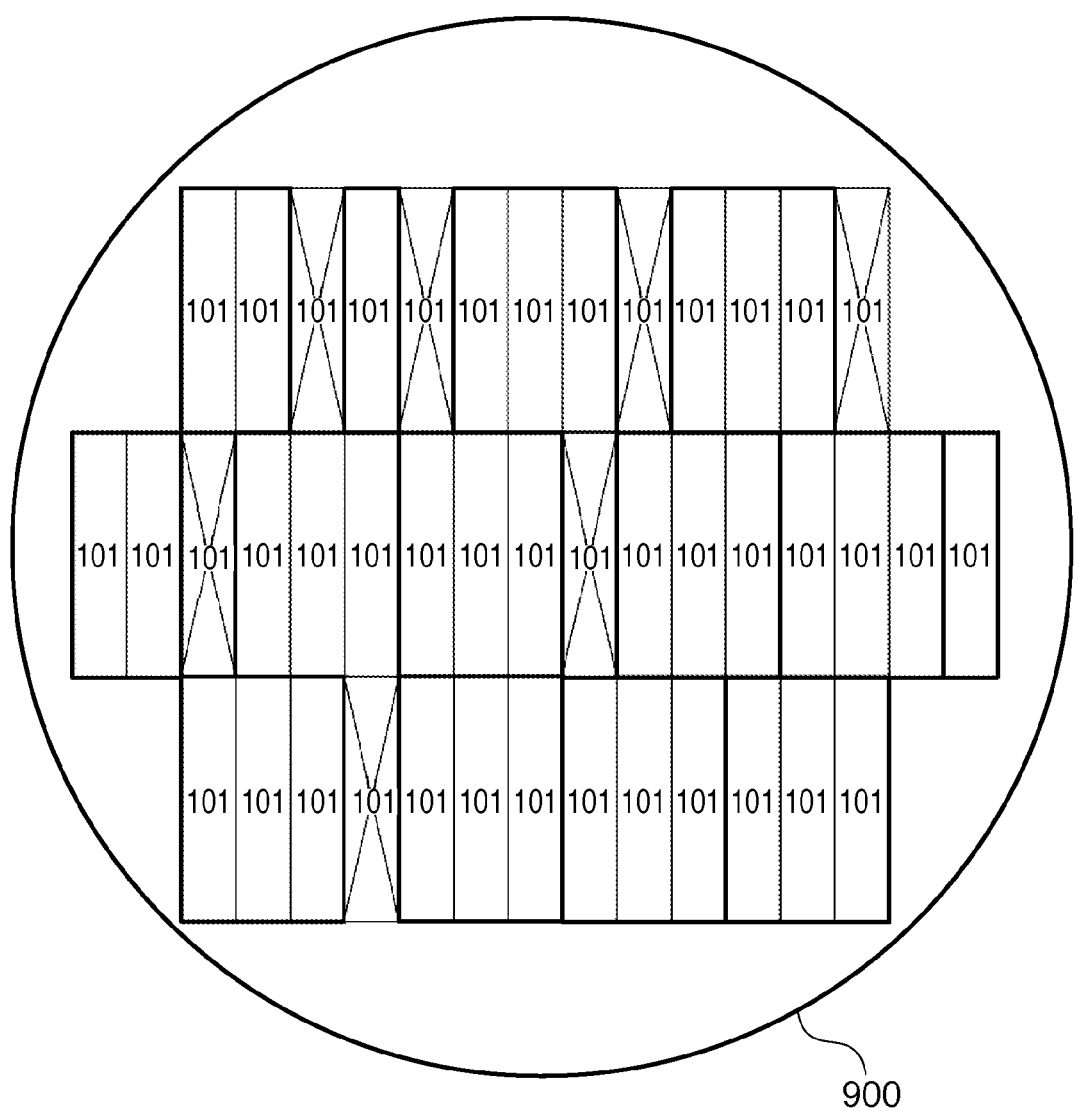

SOLID-STATE IMAGING APPARATUS AND IMAGING SYSTEM

BACKGROUND OF THE INVENTION

1. Field of the Invention

The present invention relates to a solid-state imaging apparatus and an imaging system.

2. Description of the Related Art

Japanese Patent Laid-Open No. 2002-26302 discloses forming semiconductor circuits on rectangular semiconductor substrates in various sizes cut out from an ingot and combining the rectangular semiconductor substrates to manufacture a large-area radiation imaging apparatus. Japanese Patent Laid-Open No. 2002-344809 discloses coupling a plurality of image sensors and arranging a vertical shift register and a horizontal shift register in the effective area of each image sensor.

When forming a large-area solid-state imaging apparatus by coupling a plurality of chips (corresponding to the rectangular semiconductor substrates with the semiconductor circuits in Japanese Patent Laid-Open No. 2002-26302 or the image sensors in patent reference 2), the area of each chip is preferably large. However, as the chip area increases, the problem of a signal delay caused by the parasitic resistance or the parasitic capacitance of signal lines surfaces, limiting the driving frequency. However, Japanese Patent Laid-Open Nos. 2002-26302 and 2002-344809 do not consider this problem at all.

SUMMARY OF THE INVENTION

The present invention provides a solid-state imaging apparatus that is advantageous in reducing the influence of a signal delay caused by an increase in the imaging area.

One of the aspects of the present invention provides a solid-state imaging apparatus having an imaging area formed by arranging a plurality of imaging blocks, each of the plurality of imaging blocks comprising: a pixel array in which a plurality of pixels are arranged to form a plurality of rows and a plurality of columns; a plurality of vertical signal lines provided in correspondence with the plurality of columns, respectively; a horizontal output line commonly provided for the plurality of vertical signal lines to read out signals read out to the plurality of vertical signal lines; a first scanning circuit; and a second scanning circuit, wherein signals of the pixels of a selected row in the pixel array are read out to the plurality of vertical signal lines in accordance with a driving pulse from the first scanning circuit, the signals read out to the plurality of vertical signal lines are sequentially read out to the horizontal output line in accordance with a driving pulse from the second scanning circuit, and a length in a row direction of the pixel array is smaller than a length in a column direction of the pixel array.

Further features of the present invention will become apparent from the following description of exemplary embodiments with reference to the attached drawings.

BRIEF DESCRIPTION OF THE DRAWINGS

FIG. 9 illustrates a wafer on which a plurality of imaging blocks are formed;

DESCRIPTION OF THE EMBODIMENTS

Figure 1A:
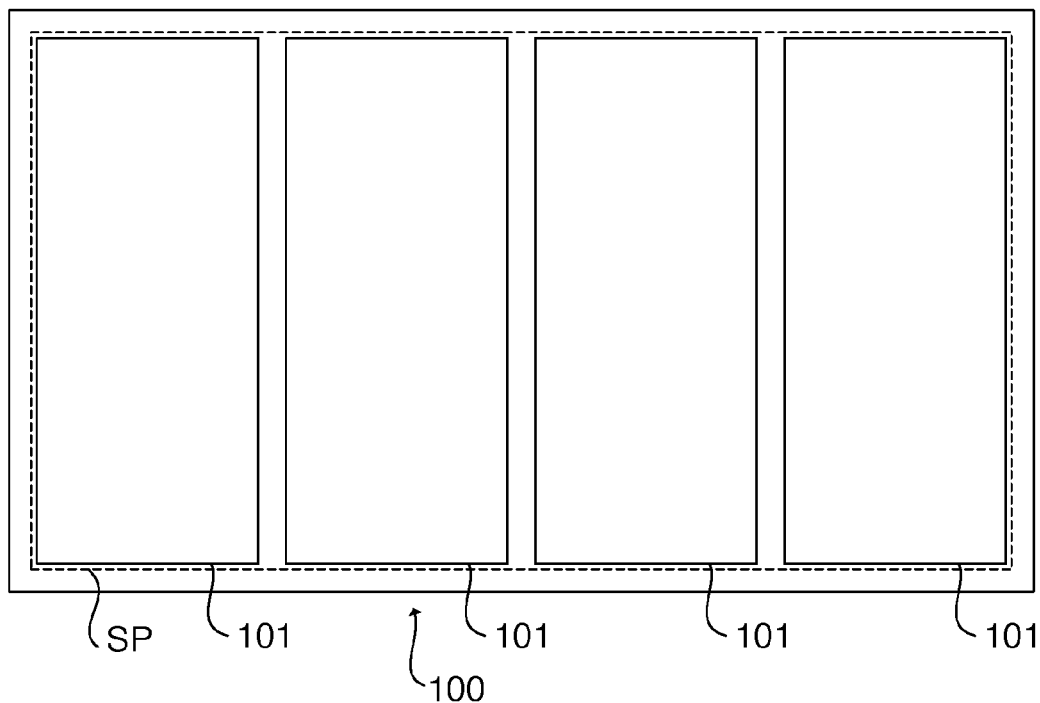
FIGS. 1A and 1B explain an example of the schematic arrangement of a solid-state imaging apparatus according to an embodiment of the present invention.
Figure 1B:
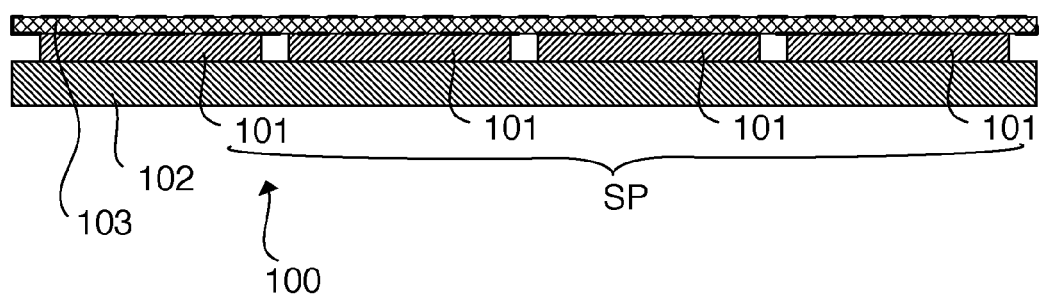

The schematic arrangement of a solid-state imaging apparatus 100 according to an embodiment of the present invention will be described with reference to FIGS. 1A and 1B. The solid-state imaging apparatus 100 can be formed by, for example, arraying a plurality of imaging blocks 101. In this case, an array of a plurality of imaging blocks 101 can form a sensor panel SP having one imaging region. The plurality of imaging blocks 101 can be arranged on a support substrate 102. When the solid-state imaging apparatus 100 uses a single imaging block 101, the single imaging block 101 forms the sensor panel SP. Each of the plurality of imaging blocks 101 may be provided by, for example, forming a circuit element on a semiconductor substrate or forming a semiconductor layer on, for example, a glass substrate and forming a circuit element on the semiconductor layer. Each of the plurality of imaging blocks 101 has a pixel array in which a plurality of pixels are arrayed so as to form pluralities of rows and columns.

The solid-state imaging apparatus 100 may serve as an apparatus which captures an image of radiation such as X-rays or an apparatus which captures an image of visible light. When the solid-state imaging apparatus 100 serves as an apparatus which captures an image of radiation, a scintillator 103 which converts radiation into visible light can typically be provided on the sensor panel SP. The scintillator 103 converts radiation into visible light, which strikes the sensor panel SP and is photoelectrically converted by each photoelectric converter on the sensor panel SP (imaging block 101).

Figure 2:
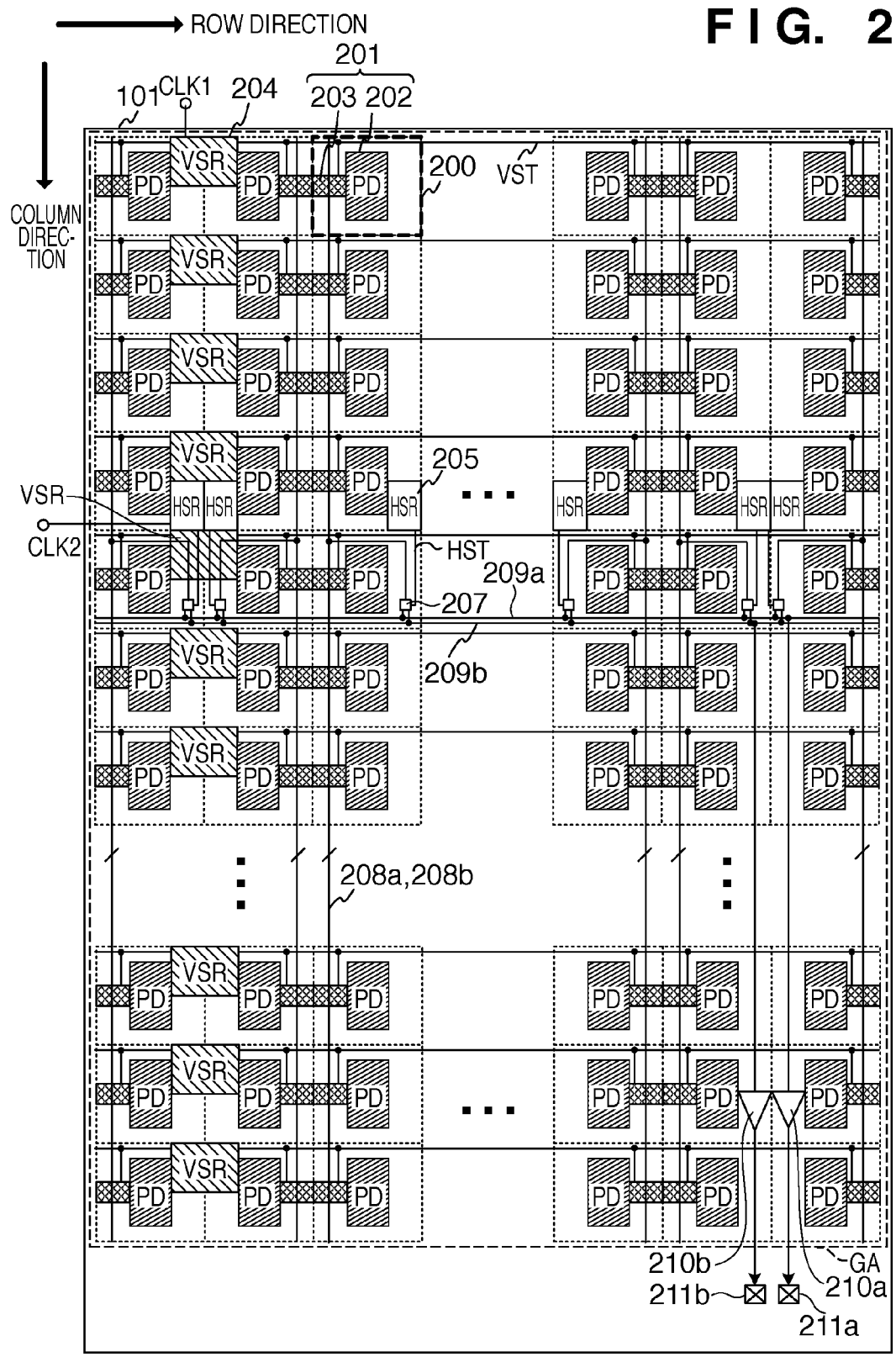
FIG. 2 explains an example of the arrangement of an imaging block according to the embodiment of the present invention.

An example of the arrangement of each imaging block 101 will be described next with reference to FIG. 2. When the solid-state imaging apparatus 100 uses a single imaging block 101, the single imaging block 101 can be regarded as a solid-state imaging apparatus. The imaging block 101 has a pixel array GA in which a plurality of pixels 201 are arrayed so as to form pluralities of rows and columns and a plurality of column signal lines 208a are arranged. Each of the plurality of pixels 201 includes a photoelectric converter (for example, a photodiode) 202, and an in-pixel readout circuit 203 which outputs a signal (light signal) corresponding to a charge generated by the photoelectric converter 202 to the column signal line 208a. In the pixel array GA, a plurality of column signal lines 208b may further be arranged, and the in-pixel readout circuit 203 can be configured to output noise generated by itself to the column signal line 208b in this case. In-pixel readout circuits 203 of two adjacent pixels 201 aligned in the row direction can be axisymmetrically arranged to have, for example, the boundary line between the two pixels 201 as their symmetry axis.

The imaging block 101 includes vertical scanning circuits 204 and horizontal scanning circuits 205. Although the vertical scanning circuit 204 can be placed, for example, between the photoelectric converters 202 on two adjacent columns, it may be placed outside the photoelectric converter 202 on the outermost column in the pixel array GA. The vertical scanning circuit 204 includes, for example, a vertical shift register which performs a shift operation in accordance with a first clock CLK1, and scans a plurality of rows in the pixel array GA in accordance with the shift operation by the vertical shift register. The vertical shift register is formed by connecting a plurality of registers in series, and a pulse received by a register in the first stage is sequentially transferred to registers in subsequent stages in accordance with the first clock CLK1. A row corresponding to a register which holds a pulse is to be selected.

Although the horizontal scanning circuit 205 can be placed, for example, between the photoelectric converters 202 on two adjacent rows, it may be placed outside the photoelectric converter 202 on the outermost row in the pixel array GA. The horizontal scanning circuit 205 includes, for example, a horizontal shift register which performs a shift operation in accordance with a second clock CLK2, and scans a plurality of columns in the pixel array GA in accordance with the shift operation by the horizontal shift register. The horizontal shift register is formed by connecting a plurality of registers in series, and a pulse received by a register in the first stage is sequentially transferred to registers in subsequent stages in accordance with the second clock CLK2. A column corresponding to a register which holds a pulse is to be selected.

The vertical scanning circuit 204 can be formed by vertically arraying a plurality of unit vertical scanning circuits (first unit scanning circuits) VSR each including one register that constitutes the vertical shift register. Each unit vertical scanning circuit VSR can be placed in the region sandwiched by a photoelectric converter 202 of a pixel belonging to a given column (the leftmost column (that is, the first column) in FIG. 2) and a photoelectric converter 202 of a pixel belonging to a column adjacent to the given column (the second column from the left (that is, the second column) in FIG. 2). When a pulse is transferred via the vertical shift register, each unit vertical scanning circuit VSR drives a row select signal VST to active level so that pixels 201 on a row to which it belongs are selected. A light signal and noise from the pixel 201 on the selected row are output to the column signal lines 208a and 208b, respectively. Referring to FIG. 2, the column signal lines 208a and 208b are indicated by a single line. Pulse signals (start pulses) PULSE1 and PULSE2 are supplied to the input terminals (not shown) of the vertical scanning circuit 204 and horizontal scanning circuit 205, respectively.

The horizontal scanning circuit 205 can be formed by horizontally arraying a plurality of unit horizontal scanning circuits (second unit scanning circuits) HSR each including one register that constitutes the horizontal shift register. Each unit horizontal scanning circuit HSR is placed in the region sandwiched by two photoelectric converters 202 in each pair of two adjacent pixels (a pair of pixels on the first and second columns, a pair of pixels on the third and fourth columns, . . . ) belonging to one row (the fourth row from the top (that is, the fourth row) in FIG. 2). However, each unit horizontal scanning circuit HSR is not placed in the region sandwiched by two photoelectric converters 202 in two adjacent pixels aligned in the column direction. This arrangement is advantageous to reduce the gap between the photoelectric converters 202 in the column direction. When a pulse is transferred via the horizontal shift register, each unit horizontal scanning circuit HSR controls a switch 207 so that a column to which it belongs is selected, that is, the column signal lines 208a and 208b on this column are connected to horizontal signal lines 209a and 209b, respectively. That is, a light signal and noise from the pixel 201 on the selected row are output to the column signal lines 208a and 208b, respectively, and signals from the selected column (that is, the selected column signal lines 208a and 208b) are output to the horizontal signal lines 209a and 209b. This implements X-Y addressing. The horizontal signal lines 209a and 209b are connected to the inputs of output amplifiers 210a and 210b, respectively, and signals output to the horizontal signal lines 209a and 209b are amplified by the output amplifiers 210a and 210b, respectively, and output via pads 211a and 211b, respectively.

The pixel array GA can be regarded as being obtained by arraying a plurality of unit cells 200 each including the pixel 201 so as to form pluralities of rows and columns. The unit cells 200 can include several types. A certain unit cell 200 includes at least part of the unit vertical scanning circuit VSR. Although a set of two unit cells 200 includes only one unit vertical scanning circuit VSR in the example shown in FIG. 2, one unit cell 200 may include one unit vertical scanning circuit VSR or a set of three or more unit cells 200 may include one unit vertical scanning circuit VSR. Another unit cell 200 includes at least part of the unit horizontal scanning circuit HSR. Although one unit cell 200 includes one unit horizontal scanning circuit HSR in the example shown in FIG. 2, a set of a plurality of unit cells 200 may include one unit vertical scanning circuit VSR. Still another unit cell 200 includes both at least part of the unit vertical scanning circuit VSR and at least part of the unit horizontal scanning circuit HSR. Still another unit cell 200 includes, for example, a unit cell including at least part of the output amplifier 210a, a unit cell including at least part of the output amplifier 210b, and a unit cell including the switch 207.

An example of the arrangement of each pixel 201 will be described with reference to FIG. 3. The pixel 201 includes the photoelectric converter 202 and in-pixel readout circuit 203, as described earlier. The photoelectric converter 202 can typically be a photodiode. The in-pixel readout circuit 203 can include, for example, a first amplifier circuit 310, a clamp circuit 320, a light signal sample-and-hold circuit 340, and a noise sample-and-hold circuit 360, and NMOS transistors 343 and 363 and row select switches 344 and 364 in a second amplifier circuit.

The photoelectric converter 202 includes a charge storage unit, which is connected to the gate of a PMOS transistor 303 of the first amplifier circuit 310. The source of the PMOS transistor 303 is connected to a current source 305 via a PMOS transistor 304. A first source follower circuit is formed using the PMOS transistor 303 and current source 305. Forming a source follower circuit using the PMOS transistor 303 is effective in reducing 1/f noise. The PMOS transistor 304 serves as an enable switch which enables the first source follower circuit upon being turned on when an enable signal EN supplied to its gate changes to active level. The first amplifier circuit 310 outputs a signal corresponding to the potential of a charge-voltage converter CVC to an intermediate node n1.

Figure 3:
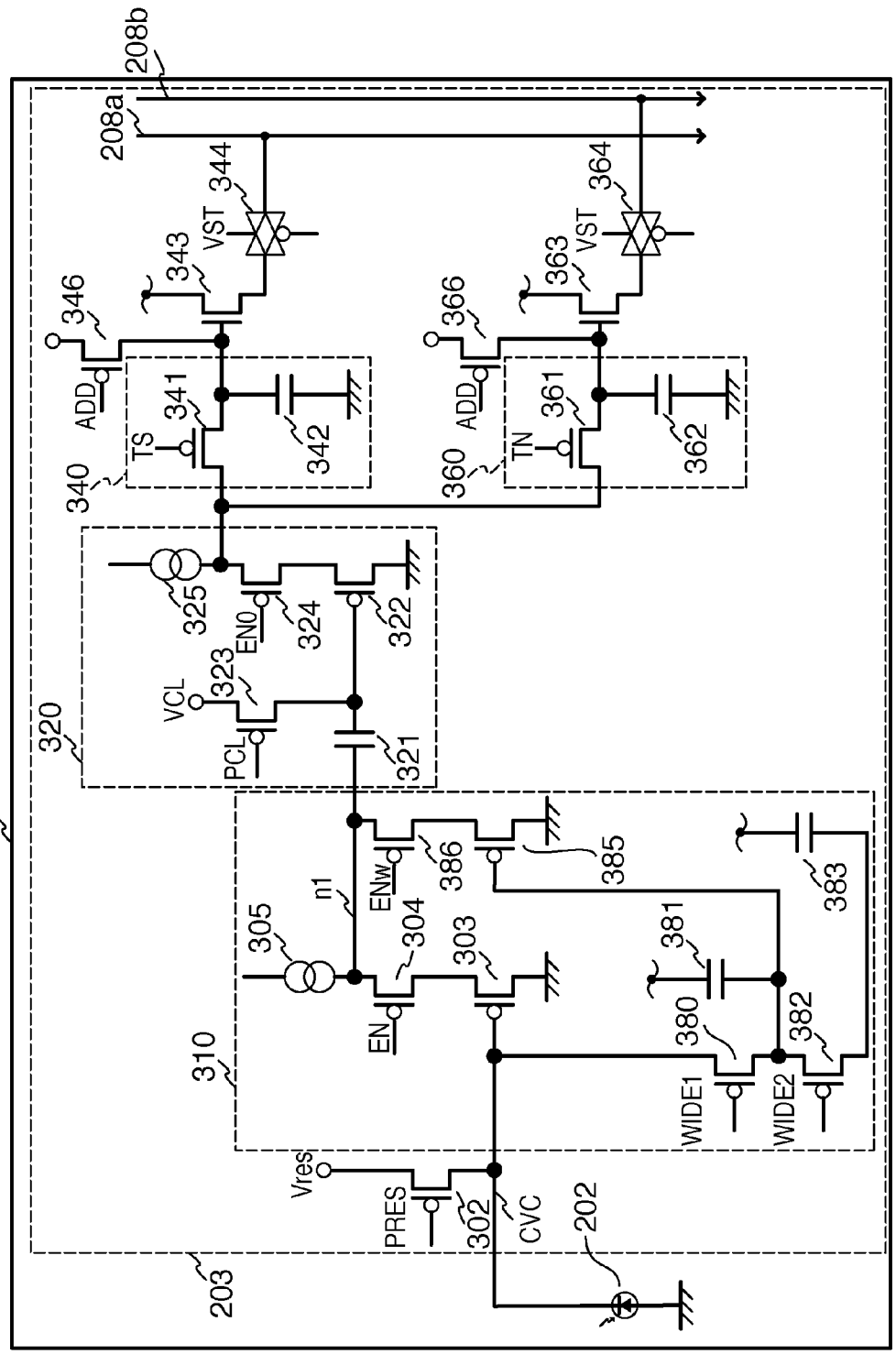
FIG. 3 explains an example of the arrangement of a pixel according to the embodiment of the present invention.

In the example shown in FIG. 3, the charge storage unit of the photoelectric converter 202 and the gate of the PMOS transistor 303 form a common node, which functions as the charge-voltage converter CVC which changes a charge stored in the charge storage unit to a voltage. That is, the charge-voltage converter CVC has the voltage V (=Q/C) determined by the charge Q stored in the charge storage unit and the capacitance value C of the charge-voltage converter CVC. The charge-voltage converter CVC is connected to a reset potential $V_{res}$ via a PMOS transistor 302 serving as a reset switch. When a reset signal PRES changes to active level, the PMOS transistor 302 is turned on, so the potential of the charge-voltage converter CVC is reset to the reset potential $V_{res}$.

The clamp circuit 320 uses a clamp capacitance 321 to clamp noise output to the intermediate node n1 by the first amplifier circuit 310 in accordance with the reset potential of the charge-voltage converter CVC. In other words, the clamp circuit 320 is a circuit for canceling that noise from a signal output from the first source follower circuit to the intermediate node n1 in accordance with the charge generated by the photoelectric converter 202. The noise output to the intermediate node n1 contains kTC noise produced upon resetting. Clamping is done by changing a clamp signal PCL to active level to turn on a PMOS transistor 323, and thereupon changing the clamp signal PCL to inactive level to turn off the PMOS transistor 323. The output terminal of the clamp capacitance 321 is connected to the gate of a PMOS transistor 322. The source of the PMOS transistor 322 is connected to a current source 325 via a PMOS transistor 324. A second source follower circuit is formed using the PMOS transistor 322 and current source 325. The PMOS transistor 324 serves as an enable switch which enables the second source follower circuit upon being turned on when an enable signal EN0 supplied to its gate changes to active level.

A signal output from the second source follower circuit in accordance with the charge generated by photoelectric conversion by the photoelectric converter 202 is written in a capacitance 342 as a light signal via a switch 341 when a light signal sampling signal TS changes to active level. A signal output from the second source follower circuit upon turning on the PMOS transistor 323 immediately after the potential of the charge-voltage converter CVC is reset is noise. This noise is written in a capacitance 362 via a switch 361 when a noise sampling signal TN changes to active level. This noise contains the offset component of the second source follower circuit.

When the unit vertical scanning circuit VSR of the vertical scanning circuit 204 drives the row select signal VST to active level, a signal (light signal) held in the capacitance 342 is output to the column signal line 208a via the NMOS transistor 343 and row select switch 344 in the second amplifier circuit. At the same time, a signal (noise) held in the capacitance 362 is output to the column signal line 208b via the NMOS transistor 363 and row select switch 364 in the second amplifier circuit. The NMOS transistor 343 in the second amplifier circuit and a constant current source (not shown) provided on the column signal line 208a form a source follower circuit. Similarly, the NMOS transistor 363 in the second amplifier circuit and a constant current source (not shown) provided on the column signal line 208b form a source follower circuit.

The pixel 201 may include an add switch 346 which adds light signals from a plurality of adjacent pixels 201. In an add mode, an add mode signal ADD changes to active level, so the add switch 346 is turned on. Thus, the add switch 346 connects the capacitances 342 of adjacent pixels 201 to each other, thereby averaging the light signals. Similarly, the pixel 201 may include an add switch 366 which adds noise signals from a plurality of adjacent pixels 201. When the add switch 366 is turned on, the add switch 366 connects the capacitances 362 of adjacent pixels 201 to each other, thereby averaging the noise signals.

The pixel 201 may have a function for changing the sensitivity. The pixel 201 can include, for example, a first sensitivity change switch 380, a second sensitivity change switch 382, and a circuit element associated with them. When a first change signal WIDE1 changes to active level, the first sensitivity change switch 380 is turned on, so the capacitance value of a first additional capacitance 381 is added to that of the charge-voltage converter CVC. This lowers the sensitivity of the pixel 201. When a second change signal WIDE2 changes to active level, the second sensitivity change switch 382 is turned on, so the capacitance value of a second additional capacitance 383 is added to that of the charge-voltage converter CVC. This further lowers the sensitivity of the pixel 201.

In this manner, adding a function of lowering the sensitivity of the pixel 201 makes it possible to receive a larger amount of light, thus widening the dynamic range. When the first change signal WIDE1 changes to active level, an enable signal $EN_w$ may be changed to active level to enable a PMOS transistor 385 to perform a source follower operation, in addition to enabling the PMOS transistor 303 to perform a source follower operation.

Figure 4A:
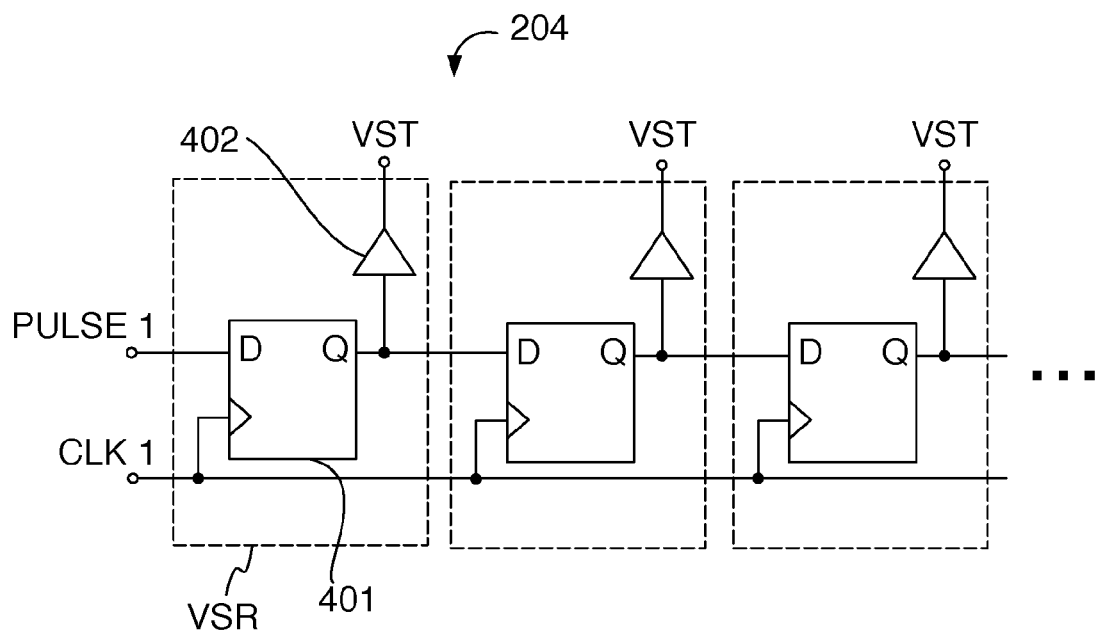
FIGS. 4A and 4B explain an example of the arrangements of shift registers according to the embodiment of the present invention.

Although the vertical scanning circuit 204 can have various arrangements, it can have an arrangement shown in, for example, FIG. 4A. In the vertical scanning circuit 204 shown in FIG. 4A, each unit vertical scanning circuit VSR includes one D-type flip-flop 401, and the first clock CLK1 is supplied to the clock input of the D-type flip-flop 401. The first pulse signal PULSE1 is supplied to the D input of the D-type flip-flop 401 of the unit vertical scanning circuit VSR in the first stage, and received in response to the first clock CLK1. The D-type flip-flop 401 in the first stage outputs a pulse signal having a duration corresponding to one cycle of the first clock CLK1 from its Q output. The Q output of the D-type flip-flop 401 of each unit vertical scanning circuit VSR is used to select a row to which the unit vertical scanning circuit VSR belongs, and is output as a row select signal VST via, for example, a buffer 402. The Q output of the D-type flip-flop 401 of each unit vertical scanning circuit VSR is connected to the D input of the D-type flip-flop 401 of the unit vertical scanning circuit VSR in the next stage.

Figure 4B:
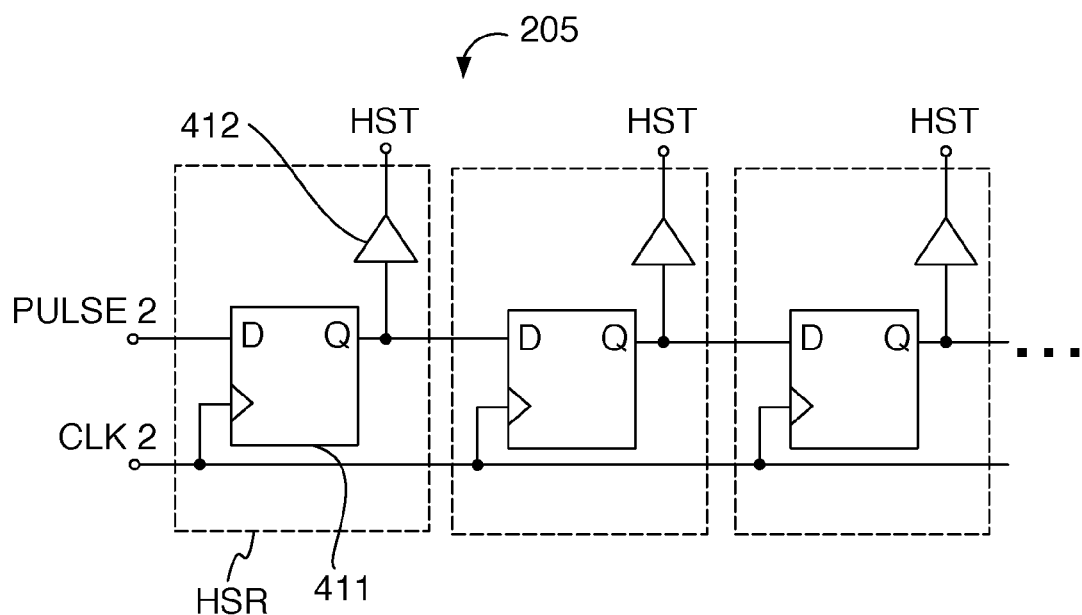

Although the horizontal scanning circuit 205 can have various arrangements, it can have an arrangement shown in, for example, FIG. 4B. In the horizontal scanning circuit 205 shown in FIG. 4B, each unit horizontal scanning circuit HSR includes one D-type flip-flop 411, and the second clock CLK2 is supplied to the clock input of the D-type flip-flop 411. The second pulse signal PULSE2 is supplied to the D input of the D-type flip-flop 411 of the unit horizontal scanning circuit HSR in the first stage, and received in response to the second clock CLK2. The unit horizontal scanning circuit HSR in the first stage outputs a pulse signal having a duration corresponding to one cycle of the second clock CLK2 from its Q output. The Q output of each unit horizontal scanning circuit HSR is used to select a column to which the unit horizontal scanning circuit HSR belongs, and is output as a column select signal HST via, for example, a buffer 412. The Q output of each unit horizontal scanning circuit HSR is connected to the D input of the D-type flip-flop 411 of the unit horizontal scanning circuit HSR in the next stage. Note that the vertical scanning period that is the scanning period of the vertical scanning circuit 204 is obtained by multiplying the horizontal scanning period of the horizontal scanning circuit 205 by the number of rows in the pixel array GA. The horizontal scanning period is the period of time required to scan all columns in the pixel array GA. Hence, the frequency of the second clock CLK2 supplied to the horizontal scanning circuit 205 which generates the column select signal HST used to select a column is greatly higher than that of the first clock CLK1 supplied to the vertical scanning circuit 204 which generates the row select signal VST used to select a row.

Figure 5:
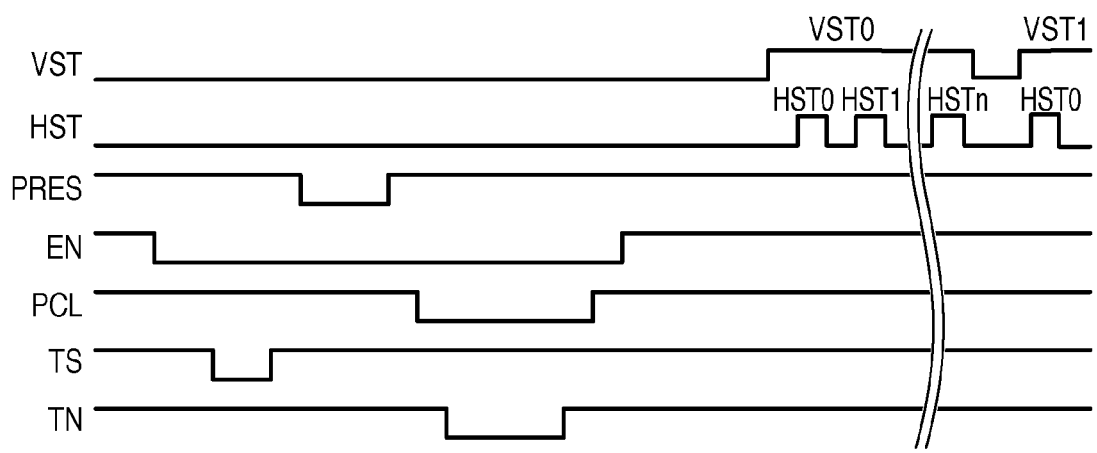
FIG. 5 explains an example of a timing chart according to the embodiment of the present invention.

Main signals supplied to each pixel 201 will be described with reference to FIG. 5. The reset signal PRES, enable signal EN, clamp signal PCL, light signal sampling signal TS, and noise sampling signal TN are low-active signals. Although not shown in FIG. 5, the enable signal EN0 can be a signal similar to the enable signal EN. Also, although not shown in FIG. 5, the enable signal $EN_w$ can make a transition in the same way as in the enable signal EN when the first change signal WIDE1 becomes active.

First, the enable signal EN becomes active on all rows in the pixel array GA, and the light signal sampling signal TS changes to active level in a pulsed pattern, so a light signal is written in the capacitance 342. Next, the reset signal PRES changes to active level in a pulsed pattern, so the potential of the charge-voltage converter CVC is reset. The clamp signal PCL changes to active level in a pulsed pattern. When the clamp signal PCL is at active level, the noise sampling signal TN changes to active level in a pulsed pattern, so noise is written in the capacitance 362.

A unit vertical scanning circuit VSR corresponding to the first row of the vertical scanning circuit 204 changes its row select signal VST (VST0) to active level. This means that the vertical scanning circuit 204 selects the first row of the pixel array GA. In this state, unit horizontal scanning circuits HSR corresponding to the first to last columns of the horizontal scanning circuit 205 change their column select signals HST (HST0-HSTn) to active level. This means that the horizontal scanning circuit 205 sequentially selects the first to last columns of the pixel array GA. Thus, light signals and noise signals of pixels on the first to last columns on the first row of the pixel array GA are output from the output amplifiers 210a and 210b, respectively. After that, a unit vertical scanning circuit VSR corresponding to the second row of the vertical scanning circuit 204 changes its row select signal VST (VST1) to active level. Unit horizontal scanning circuits HSR corresponding to the first to last columns of the horizontal scanning circuit 205 change their column select signals HST (HST0-HSTn) to active level. By performing such an operation for the first to last rows, one image is output from the pixel array GA.

Figure 6:
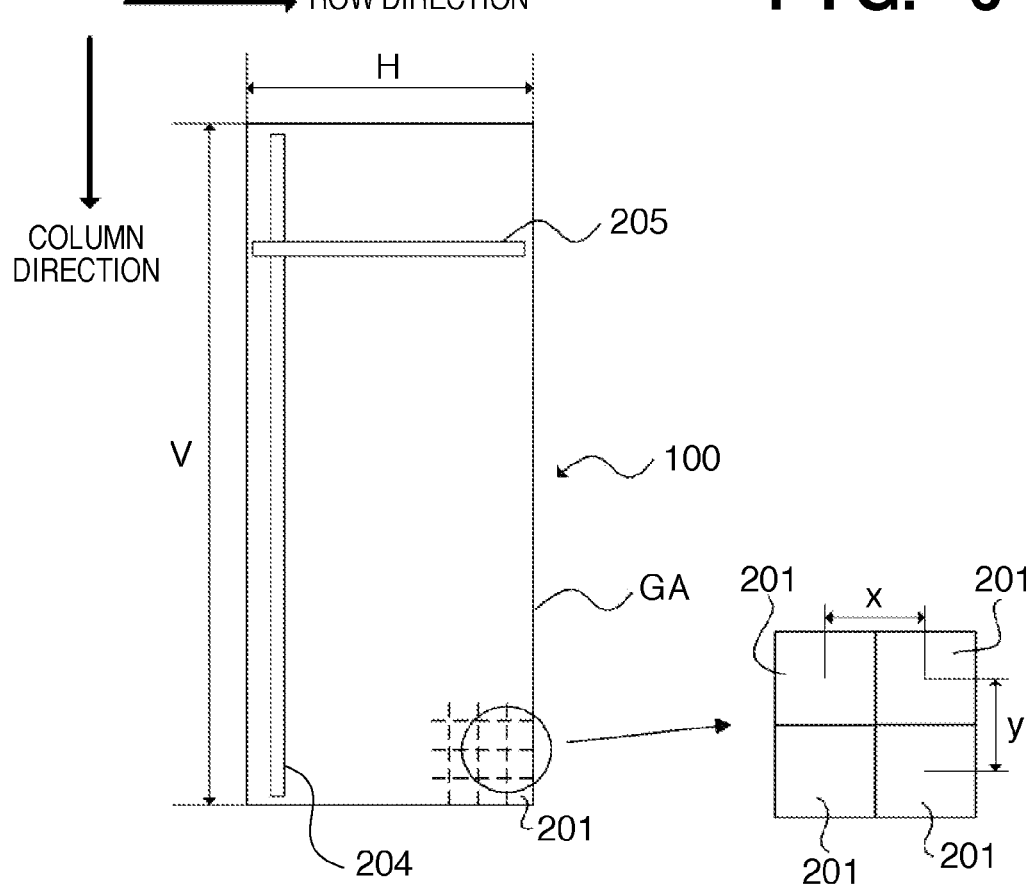
FIG. 6 illustrates the preferable shape of each imaging block.

The preferable shape of each imaging block 101 when considering an increase in the imaging area will be described next with reference to FIG. 6. A length H of each imaging block 101 in the row direction of the pixel array GA is preferably smaller than a length V in the column direction of the pixel array GA. The row direction is the direction parallel to the rows of the pixel array GA, and the column direction is that parallel to the columns of the pixel array GA. Letting x be the pitch of the pixels 201 (the center distance of the pixels 201) in the row direction, and m be the number of columns of the pixel array GA, the length H in the row direction of the pixel array GA is m·x. Letting y be the pitch of the pixels 201 in the column direction, and n be the number of rows of the pixel array GA, the length V in the column direction of the pixel array GA is n·y. When x=y, m<n preferably holds.

Figure 7:
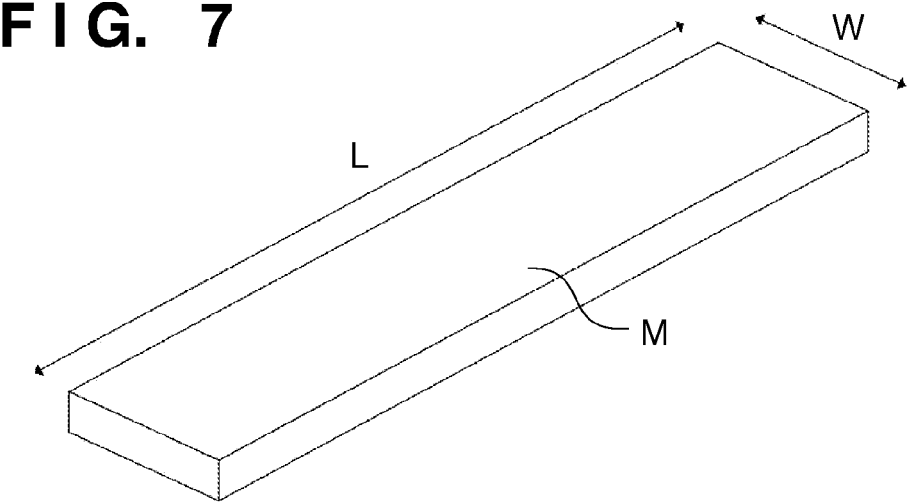
FIG. 7 explains a signal delay caused by a wiring pattern.

The reason why the length H of the imaging block 101 in the row direction of the pixel array GA is preferably smaller than the length V in the column direction of the pixel array GA will be described below. Consider a wiring pattern M as shown in FIG. 7 to evaluate the parasitic capacitance and the parasitic resistance, which cause a signal delay in a signal line.

A parasitic capacitance Cp and a parasitic resistance Rp of the wiring pattern M are expressed by $$Cp = L \cdot W \cdot Cox$$

$$Rp = L/W \cdot \sigma$$

where L is the length of the wiring pattern M, W is the width of the wiring pattern M, Cox is the capacity per unit area of the wiring pattern M, and σ is the sheet resistance of the wiring pattern M.

The delay amount of the signal transmitted by the wiring pattern M can be evaluated by the time constant τ of the wiring pattern M. Since τ=Cp·Rp, $$\tau = (L \cdot W \cdot Cox) \cdot (L/W \cdot \sigma)$$
$$= L^2 \cdot Cox \cdot \sigma$$

The time constant τ is proportional to the square of L. That is, the time delay of the signal transmitted by the wiring pattern increases in proportion to the length of the wiring pattern.

On the other hand, the frequency of the second clock CLK2 supplied to the horizontal scanning circuit 205 is much higher than the frequency of the first clock CLK1 supplied to the vertical scanning circuit 204, as described above. Hence, making the transmission line of the second clock CLK2 for which the time delay is more critical as short as possible contributes to improvement of the frame rate. As a guide, the length H in the row direction of the pixel array GA is preferably made smaller than the length V in the column direction of the pixel array GA. H<0.8V is more preferable, H<0.5V is still more preferable, and H<0.3V is much more preferable.

Figure 8A:
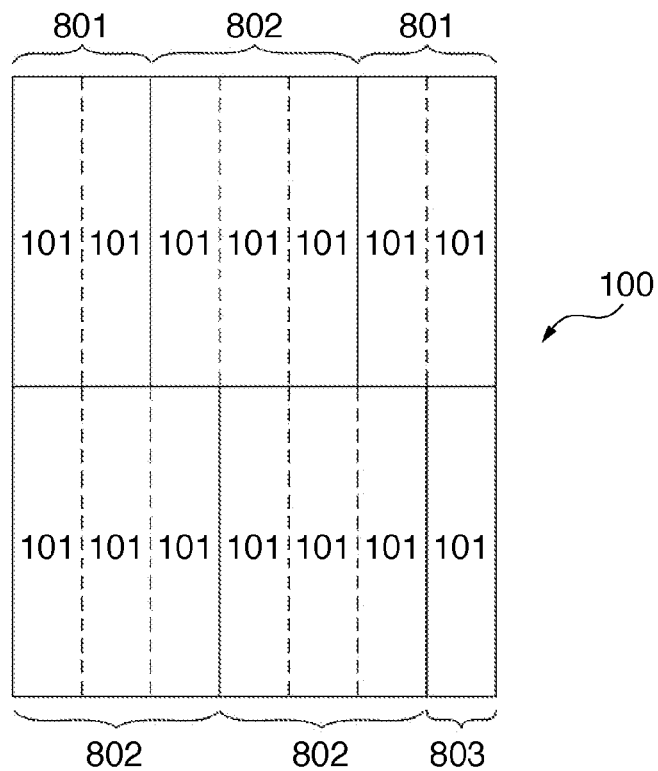
FIGS. 8A and 8B illustrate an example of the arrangement of a solid-state imaging apparatus.
Figure 8B:
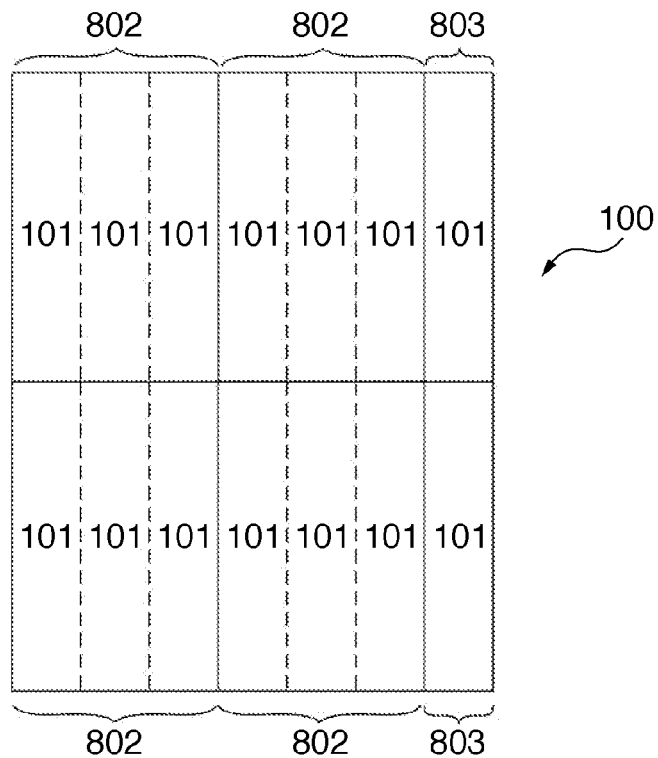

Another problem when considering the increase in imaging area will be examined. When the imaging blocks 101 included in the solid-state imaging apparatus 100 can be made larger, the number of imaging blocks 101 included in the solid-state imaging apparatus 100 can be decreased. In this case, however, the yield of the imaging blocks 101 may be decreased. To prevent this, for example, the solid-state imaging apparatus 100 is preferably formed by determining the size of each imaging block 101 in consideration of the yield in addition to the above-described relationship between H and V and coupling chips each including one or a plurality of imaging blocks 101. In the example of FIG. 8A, the imaging area formed by arranging the plurality of imaging blocks 101 includes chips 801 each including two imaging blocks 101, chips 802 each including three imaging blocks 101, and a chip 803 including one imaging block 101. In the example of FIG. 8B, the imaging area formed by arranging the plurality of imaging blocks 101 includes the chips 802 each including three imaging blocks 101 and the chips 803 each including one imaging block 101. FIGS. 8A and 8B show examples of the solid-state imaging apparatus 100 which has an imaging area formed by arranging the plurality of imaging blocks 101 and includes a plurality of chips including chips each formed from the imaging blocks 101 in the first number and chips each formed from the imaging blocks 101 in the second number different from the first number.

For example, assume that on a wafer 900 with the imaging blocks 101 as shown in FIG. 9, the imaging blocks 101 indicated by X have defects. In this case, if the maximum chip size equals the size of three imaging blocks 101, the non-defective imaging blocks 101 can be diced so that, for example, the chips indicated by the bold lines are obtained. In this case, chips each including one imaging block 101, chips each including two imaging blocks 101, and chips each including three imaging blocks 101 are obtained. In this example, if one chip should always include three imaging blocks 101, some imaging blocks 101 are discarded without defects. On the other hand, when dicing the wafer 900 such that each chip should include one imaging block 101, the number of chips to be aligned with each other to form the solid-state imaging apparatus 100 increases, resulting in poor workability.

Figure 11:
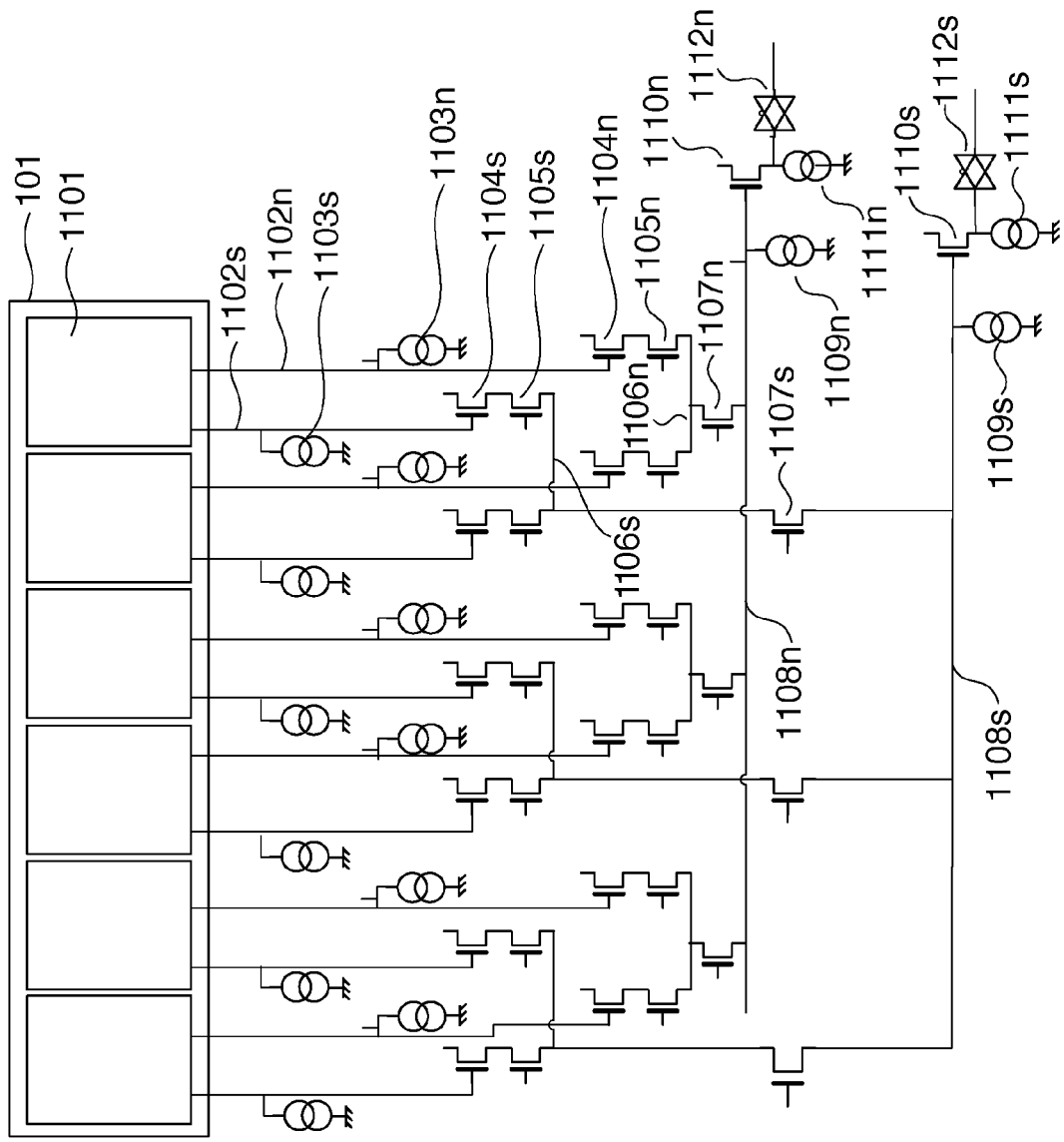
FIG. 11 explains an example of the arrangement of an imaging block according to another embodiment of the present invention.

Another example of the arrangement of the imaging block 101 will be described with reference to FIG. 11. FIG. 11 is a conceptual diagram of an equivalent circuit of each imaging block 101. The imaging area of each imaging block 101 has a plurality of columns 1101. Each column 1101 has a plurality of pixels corresponding to a plurality of rows, respectively. Each pixel can have various arrangements and, for example, the arrangement shown in FIG. 3.

In accordance with a driving pulse supplied from the horizontal scanning circuit (not shown), the signal of each row is sequentially output to the vertical signal line. The signals of the plurality of pixels included in each row can simultaneously be output to the corresponding vertical signal lines. A constituent element denoted by a reference numeral with a suffix "s" handles a light signal on which a noise signal is superimposed (to be simply referred to as a light signal hereinafter). A constituent element denoted by a reference numeral with a suffix "n" handles a noise signal generated in the pixel. For example, a vertical signal line 1102s transmits a light signal, and a vertical signal line 1102n transmits a noise signal generated in the pixel. When time-divisionally reading out the light signal and the noise signal, only one vertical signal line suffices for each column. When each pixel includes an amplifier circuit, current sources 1103s and 1103n supply bias currents to the amplifier circuits. As the amplifier circuit, for example, a source follower circuit can be used.

Column amplifier circuits 1104s and 1104n are provided in correspondence with the vertical signal lines 1102s and 1102n, respectively. In this arrangement example, the column amplifier circuits 1104s and 1104n are source follower circuits. Select switches 1105s and 1105n are set active sequentially or at random by a driving pulse supplied from the horizontal scanning circuit (not shown). Block horizontal signal lines 1106s and 1106n are provided while electrically isolated for every plurality of columns included in the block. Signals from the plurality of columns of the block can be read out to the block horizontal signal lines 1106s and 1106n. Reference numerals 1107s and 1107n denote block select switches. The signals read out to the block horizontal signal lines 1106s and 1106n are read out to horizontal signal lines 1108s and 1108n by setting the block select switches 1107s and 1107n active sequentially or at random. The block select switches 1107s and 1107n can be controlled by the driving pulse from the horizontal scanning circuit (not shown). In this arrangement example, the block horizontal signal lines 1106s and 1106n and the horizontal signal lines 1108s and 1108n are directly driven by the column amplifier circuits 1104s and 1104n that are source follower circuits. The column amplifier circuits 1104s and 1104n drive the block horizontal signal lines 1106s and 1106n and the horizontal signal lines 1108s and 1108n based on the signals read out to the vertical signal lines 1102s and 1102n.

Current sources 1109s and 1109n supply bias currents to the column amplifier circuits 1104s and 1104n. The current sources 1109s and 1109n supply the currents to the column amplifier circuits 1104s and 1104n via the horizontal output lines 1108s and 1108n, the block select switches 1107s and 1107n, the block horizontal signal lines 1106s and 1106n, and the select switches 1105s and 1105n. Hence, the column amplifier circuits 1104s and 1104n corresponding to the column selected by the horizontal scanning circuit (not shown) drive the block horizontal signal lines 1106s and 1106n and the horizontal signal lines 1108s and 1108n. Amplifier circuits 1110s and 1110n are arranged on the electrical paths between the horizontal signal lines 1108s and 1108n and an output pad (not shown). In the arrangement example shown in FIG. 11, the amplifier circuits 1110s and 1110n are source followers. The signals amplified by the amplifier circuits 1110s and 1110n are output via the output pad, and a signal processing IC of the succeeding stage performs signal processing such as A/D conversion. A common signal processing IC may be provided for a plurality of imaging blocks 101, or a plurality of signal processing ICs may be provided for each imaging block 101 or a predetermined number of imaging blocks 101. Current sources 1111s and 1111n supply bias currents to the amplifier circuits 1110s and 1110n. Reference numerals 1112s and 1112n denote chip select switches.

In such an imaging apparatus, the signal readout is performed in accordance with the following sequence. Signals of a predetermined row are read out to corresponding vertical signal lines almost simultaneously in accordance with the driving pulse from the vertical scanning circuit (not shown). After that, the signals read out to the plurality of vertical signal lines are sequentially read out to the horizontal signal lines via the block horizontal signal lines in accordance with the driving pulse from the horizontal scanning circuit (not shown). In such an arrangement, the plurality of signals are parallelly read out to the vertical signal lines and then serially converted when output to the horizontal output line. In this arrangement, the speed upon serially converting and reading out the signals sometimes determines the readout speed of the signals of the entire image. At this time, if the imaging block is long in the row direction, the resistance and load of the horizontal output line increase, resulting in disadvantage from the viewpoint of the speed. Especially when the amplifier circuits provided on the columns directly drive the horizontal output lines, as in the arrangement of FIG. 11, the resistance and load of the horizontal output line particularly affect the speed.

Figure 10:
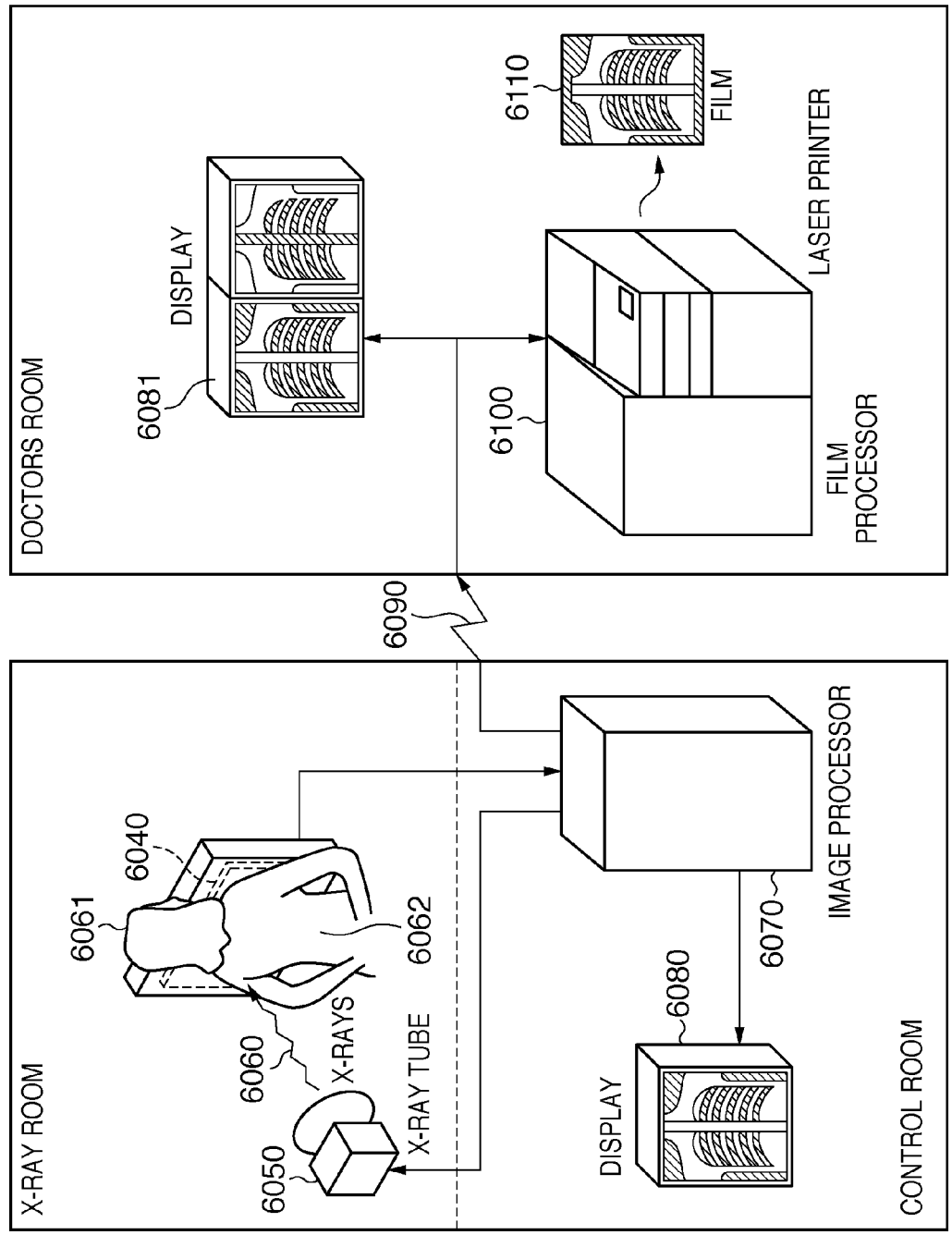
FIG. 10 illustrates a radiation imaging system.

FIG. 10 illustrates an example in which the solid-state imaging apparatus according to the present invention is applied to an X-ray diagnostic system (radiation imaging system). The radiation imaging system includes a radiation imaging apparatus 6040 and an image processor 6070 which processes a signal output from the radiation imaging apparatus 6040. The radiation imaging apparatus 6040 serves as an apparatus to which the solid-state imaging apparatus 100 mentioned above is applied and which captures radiation, as illustrated in FIG. 1B. X-rays 6060 emitted by an X-ray tube (radiation source) 6050 are transmitted through a chest 6062 of a patient or a subject 6061, and enter the radiation imaging apparatus 6040. The incident X-rays bear the information of the interior of the body of the subject 6061. The image processor (processor) 6070 processes a signal (image) output from the radiation imaging apparatus 6040, and can display the image on, for example, a display 6080 in a control room based on the signal obtained by processing.

Also, the image processor 6070 can transfer the signal obtained by processing to a remote site via a transmission path 6090. This makes it possible to display the image on a display 6081 placed in, for example, a doctor room at another site or record the image on a recording medium such as an optical disk. The recording medium may be a film 6110, and a film processor 6100 records the image on the film 6110 in this case.

The solid-state imaging apparatus according to the present invention is also applicable to an imaging system which captures an image of visible light. Such an imaging system can include, for example, the solid-state imaging apparatus 100 and a processor which processes a signal output from the solid-state imaging apparatus 100. The processing by the processor can include at least one of, for example, processing of converting the image format, processing of compressing the image, processing of changing the image size, and processing of changing the image contrast.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-155257, filed Jul. 7, 2010 and 2011-119712, filed May 27, 2011, which are hereby incorporated by reference herein in their entirety.

What is claimed is:

1. A solid-state imaging apparatus having an imaging area formed by arranging a plurality of imaging blocks,
   each of the plurality of imaging blocks comprising:
   a pixel array in which a plurality of pixels are arranged to form a plurality of rows and a plurality of columns;
   a plurality of vertical signal lines provided in correspondence with the plurality of columns, respectively;
   a horizontal output line commonly provided for the plurality of vertical signal lines to read out signals read out to the plurality of vertical signal lines;
   a first scanning circuit; and
   a second scanning circuit,
   wherein signals of the pixels of a selected row in the pixel array are read out to the plurality of vertical signal lines in accordance with a driving pulse from the first scanning circuit,
   the signals read out to the plurality of vertical signal lines are sequentially read out to the horizontal output line in accordance with a driving pulse from the second scanning circuit, and
   a length in a row direction of the pixel array is smaller than a length in a column direction of the pixel array.

2. The apparatus according to claim 1, wherein the first scanning circuit is arranged in the pixel array.

3. The apparatus according to claim 1, wherein the second scanning circuit is arranged in the pixel array.

4. The apparatus according to claim 1, wherein the imaging area formed by arranging the plurality of imaging blocks is formed from a chip including the imaging blocks in a first number and a chip including the imaging blocks in a second number different from the first number.

5. The apparatus according to claim 1, wherein the second scanning circuit is formed by horizontally arranging a plurality of second unit scanning circuits each including one register, each of the second unit scanning circuits being arranged in an area sandwiched by two photoelectric converters in each pair of two adjacent pixels of one row but not arranged in an area sandwiched by two photoelectric converters in two pixels adjacent in the column direction.

6. The apparatus according to claim 5, wherein the first scanning circuit is formed by vertically arranging the plurality of second unit scanning circuits each including one register, each of the second unit scanning circuits being arranged in an area sandwiched by a photoelectric converter of a pixel of a column and a photoelectric converter of a pixel of a column adjacent to the column.

7. The apparatus according to claim 1, further comprising a source follower circuit which directly drives the horizontal output line in accordance with the signals read out to the plurality of vertical signal lines.

8. The apparatus according to claim 1, further comprising a scintillator which converts radiation into visible light,
   wherein the plurality of imaging blocks are arranged to photoelectrically convert the visible light, and
   the solid-state imaging apparatus is formed as a radiation imaging apparatus.

9. An imaging system comprising:
   a solid-state imaging apparatus defined in claim 1; and
   a processor which processes a signal output from the solid-state imaging apparatus.

* * * * *